Jan. 11, 1966  E. M. FAULKNER 3RD  3,228,686
MOLDED PLASTIC GAME BALL
Filed Aug. 4, 1961

INVENTOR.
Ellis May Faulkner 3rd
BY
Arthur A. March
ATTORNEY

United States Patent Office 3,228,686
Patented Jan. 11, 1966

3,228,686
MOLDED PLASTIC GAME BALL
Ellis May Faulkner 3rd, Albany, N.Y., assignor to Albany Billiard Ball Company, Albany, N.Y., a corporation of New York
Filed Aug. 4, 1961, Ser. No. 129,415
4 Claims. (Cl. 273—59)

This invention relates to game balls such as billiard balls and the like, and more particularly to balls of this class which are formed of molded plastic substance.

An object of the invention is to provide a novel and improved composite molded plastic game ball, especially a billiard ball or the like, wherein the entire molded structure is devoid to the greatest possible extent of both internal and external hollows or voids.

Another object of the invention is to provide an improved game ball as above characterized, wherein internal stresses are held to a minimum, thereby contributing greatly to the stability and durability of balls of this type as molded by the injection process.

A further object of the invention is to provide an improved molded ball of the kind outlined, which has the above specified attributes and advantages and is further especially economical to fabricate and produce.

Other features and advantages will hereinafter appear.

In the drawings accompanying this specification, similar characters of reference are used to designate like components and portions throughout the several views, in which.

Figure 5:
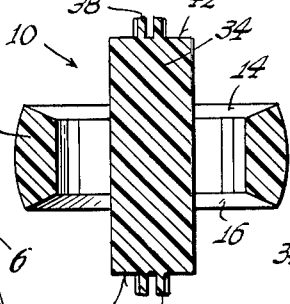
FIG. 5 is a diametric sectional view of the insert or core structure, taken on the line 5—5 of FIG. 4.
Figure 6:
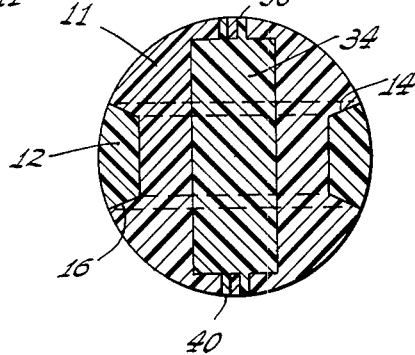
FIG. 6 is a diametric sectional view of the entire composite ball structure, taken on the line 6—6 of FIG. 2.

Considering first FIGS. 5 and 6, it is seen that the present game or billiard ball is constituted essentially of two, molded plastic, main components, a molded core or insert structure designated generally by the numeral 10, and a second molded plastic structure 11 which is not only disposed on both sides of the molded part 10 but which also extends through openings (shortly to be described) in the core structure, by which all portions of the second molded part are integral with each other even though oppositely disposed about the core structure 10.

In accordance with the present invention, the molded core structure 10, which is preferably injection molded, is constituted in a novel manner by which it has at least one through opening and preferably has a plurality of through openings extending between opposite sides of a central rim-like portion 12 of such core structure, the said opposite sides being designated generally by the numerals 14 and 16. The through openings in the core structure 10 are indicated at 18, 20, 22 and 24, and may be advantageously constituted as spaces between a plurality of radial spokes 26, 28, 30 and 32 which extend from a central hub portion 34 of the core structure, outward to the annular or ring-like central rim-like portion 12.

Figure 1:
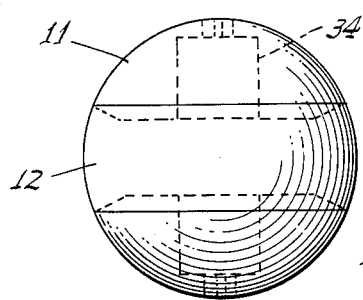
FIG. 1 is a side elevational view of the improved injection molded plastic game ball as provided by the invention.
Figure 3:
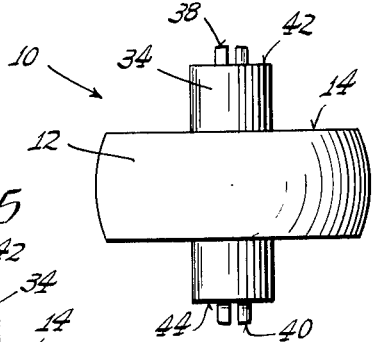
FIG. 3 is a side elevational view of a molded plastic insert or core structure constituting a portion of the game ball.

As seen in FIGS. 1, 3 and 5, the central annular portion 12 of the core structure is preferably so constituted as to present an outer curved or convex surface which constitutes a central zone of a true spherical surface.

Also, the central annular rim portion 12 of the molded core structure is so constituted that the opposite side surfaces 14 and 16 are somewhat dished or of conical shape, being arranged in such a manner that the theoretical apices of the conical shapes would coincide and lie at the center of the rim 12 and hub 34.

Figure 2:
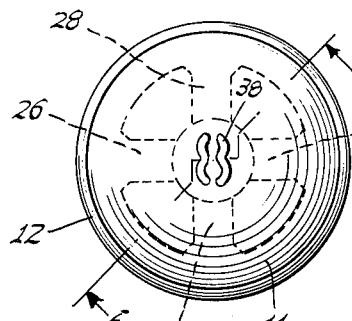
FIG. 2 is a top plan view of the game ball.
Figure 4:
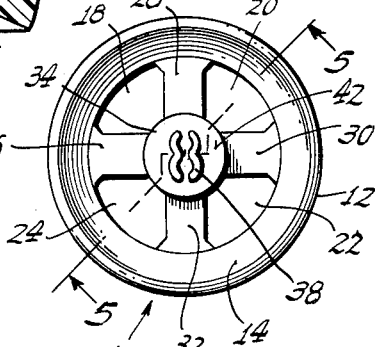
FIG. 4 is a top plan view of the insert or core structure of FIG. 3.

The spokes 26, 28, 30 and 32, shown as being four in number, may have an appreciable thickness axially as seen in FIG. 5, as well as having appreciable width, this latter being shown in FIGS. 2 and 4.

Preferably also the hub 34 has an axial length which is substantially commensurate with the diameter of the central portion or rim 12 of the core 10 whereby the two opposite extremities or ends 38 and 40 of the hub 34 will be disposed at the exterior surface of the composite ball structure, as seen for example in FIGS. 1 and 2. The ends 38 and 40 of the hub 34 may have any desired configuration, that shown being in the form of a figure 8 separated down the middle. Disposed inwardly of the ends 38 and 40, the hub 34 has wide annular shoulders 42 and 44 formed by the end portions of a solid cylindrical body constituting the major portion of the hub.

In accordance with the invention, in conjunction with the open or apertured, molded core structure 10 having the through openings extending between the opposite sides 14, 16 of the central rim portion 12, there is injection molded the second and complementary plastic structure indicated generally by the numeral 11. Such fabrication is done in a spherical mold, the core or insert 10 being placed in the mold and positioned thereby, as by engagement between the spherical mold surfaces and the hub ends 38, 40 as well as engagement with the outer convex surface of the rim portion 12 of the core. With the core 10 thus properly positioned in the mold, plastic substance is injection molded about the core, such substance filling all of the voids and interstices about the hub ends 38, 40 and being disposed between the spokes 26, 28, 30 and 32 so as to occupy fully the through openings 18, 20, 22 and 24.

I have found that by thus injection molding the ball in the above manner wherein there is first injection molded a core or insert structure characterized by opposite sides and at least one and preferably a plurality of through openings extending between the opposite sides, and thereafter injection molding plastic substance, as of a different color, about the injection molded core or insert, there is eliminated to the maximum extent any tendency for hollows or voids, both internal and external, to be formed in the molded ball as a consequence of the injection molding procedure. Further, the method of fabricating the game ball by first injection molding an open core insert and thereafter injection molding the remainder of the ball about the said insert results in smaller internal stresses, which tends to contribute to the stability of the composite structure and to the durability of the ball, as compared with other injection molded objects.

Various types of plastic substance may be utilized, in carrying out the invention. For example, balls may be molded or cast of phenolic resin, celluloid base plastics, polycarbonate resin, polystyrene, acrylic plastic, cellulose acetate, etc. The invention has special utility in connection with an injection molding procedure, since it has been found that there is eliminated to the greatest possible extent the presence of air bubbles, voids, hollows, etc. which have heretofore characterized fabrication of plastic balls wherein solid core inserts are used, as distinguished from the open core structure illustrated herein.

While a total of four spokes are shown, it will be understood that the invention is not limited to this number, since a lesser or greater number may be used as well. Either two or three spokes may be utilized, for example.

After the molded plastic substance constituting the second molded structure 11 has been formed about the core structure 10, a suitable surface finishing operation may be employed, to effect a truly spherical exterior surface for the ball, as will be readily understood. The extremities 38 and 40 will be visible at the exterior ball surface as shown in FIG. 2, and these may have special utility. For example, where the second molded structure 11 is of a contrasting color as compared with the molded core structure 10, the extremities 38 and 40 will readily stand out, and by this arrangement various designations, etc. such as numbers and the like may be provided, to be visible at the exterior ball surface.

Referring to FIGS. 5 and 6, the sloping or hollow nature of the side surfaces 14 and 16 provides radial fused joints around the circular rim portion 12, which is of advantage in avoiding sharp or thin exposed sections.

In practicing the method of the invention, there is first molded the plastic open core structure 10 as by an injection molding procedure, and thereafter such core structure having at least one and preferably a plurality of through openings extending between the opposite sides thereof, is placed in a generally spherical mold, with portions of the core contacting the mold for support. Then the remaining portion of the ball is injection molded about the said core structure, whereby the last-molded substance occupies the through openings of the core and conforms to the core and to the mold contours. Finally, the surface finishing operation, of any suitable type, may be employed.

I am aware that heretofore balls have been molded or formed of plastic material which is molded about a solid core. However, I do not claim this as my invention but instead the molding of plastic material about a molded plastic, open-type core to form a composite ball structure as set forth in detail in the appended claims. And, variations and modifications may be made within the scope of the claims, with portions of the improvements used without others.

I claim:

1. A solid injected molded game ball comprising a solid core structure including an endless ring-like section, a substantially cylindrical hub extending axially through said ring-like section, said hub being disposed normal to the central axial plane of said ring-like section and having an axial length substantially equal to the diameter of said ring-like section, and radially extending spokes interconnecting said ring-like member to said hub; and a second solid structural member only disposed on opposite sides of the core structure and between the spokes within the endless ring-like section, said two structures having exterior exposed surfaces which together define a sphere.

2. An injected molded plastic solid game ball comprising a molded plastic core structure including an endless circular rim, a central cylindrical hub extending through said rim, said hub being disposed normal to the central axial plane of said rim, and a plurality of radially disposed spokes extending between said hub and said rim for integrally connecting said hub and rim, said rim having oppositely disposed conical surfaces, the theoretical apices of which coincide at the center of said axial plane, said rim having its outermost surface curved so as to constitute a central zone of a true spherical surface, and a second integrally injected molded plastic structure disposed on opposite sides of said rim and filling the voids between said spokes whereby said two molded structures have exteriorly exposed surfaces which together define a sphere.

3. The invention as defined in claim 1 wherein said hub ends have relatively wide annular shoulders spaced inwardly from the respective ends thereof, and said hub ends projecting beyond said shoulder portion being separated down the center thereof.

4. A solid injected molded plastic spherical game ball comprising a molded plastic core structure including an endless circular rim, a central cylindrical hub extending through said rim, said hub being disposed normal to the central axial plane of said rim, said hub having an axial length substantially equal to the diameter of the rim whereby the ends of said hub are adapted to be disposed at the outer surface of the ball, and said hub ends having relatively wide annular shoulders spaced inwardly from the respective ends thereof, and said hub ends projecting beyond said shoulder portions, and a plurality of radially disposed spokes extending between said hub and said rim for integrally connecting said hub and rim, said rim having oppositely disposed conical side surfaces, the theoretical apices of which coincide at the center of said axial plane, said rim having its outermost surface curved so as to constitute a central zone of a true spherical surface, and a second, solid integrally molded plastic structure disposed on opposite sides of said rim and through the voids between said spokes whereby said two molded structures are integrally bonded and have exteriorly exposed surfaces which together define a sphere, and said hub ends being shaped in the form of identifying indicia rendered visible at the outer surface of the ball.

References Cited by the Examiner

UNITED STATES PATENTS

| | | | |
|---|---|---|---|
| 507,880 | 10/1893 | Burt | 273—59 X |
| 833,882 | 10/1906 | Le Fevre. | |
| 1,686,142 | 10/1928 | Bonsieur | 264—273 X |
| 2,223,394 | 12/1940 | Thompson | 273—59 |
| 2,395,675 | 2/1946 | Luth | 273—59 X |
| 2,456,615 | 12/1948 | Berglund | 264—273 |
| 2,517,116 | 8/1950 | Klinger | 273—82 |
| 2,568,274 | 9/1951 | Clark | 273—82 X |
| 2,737,391 | 3/1956 | Brinkmann | 273—82 |
| 2,787,024 | 4/1957 | Smith | 264—275 |
| 3,046,013 | 7/1962 | Kutik | 273—59 |
| 3,090,620 | 5/1963 | Consolloy | 273—63 |

FOREIGN PATENTS

| | | |
|---|---|---|
| 1,258,929 | 3/1961 | France. |

RICHARD C. PINKHAM, *Primary Examiner.*